(12) United States Patent
Christensen et al.

(10) Patent No.: US 12,172,896 B2
(45) Date of Patent: Dec. 24, 2024

(54) ATR-BASED HYDROGEN PROCESS AND PLANT

(71) Applicant: HALDOR TOPSØE A/S, Kgs. Lyngby (DK)

(72) Inventors: Steffen Spangsberg Christensen, Køge (DK); Arunabh Sahai, Haryana (IN)

(73) Assignee: HALDOR TOPSØE A/S, Kgs. Lynby (DK)

( * ) Notice: Subject to any disclaimer, the term of this patent is extended or adjusted under 35 U.S.C. 154(b) by 597 days.

(21) Appl. No.: 17/594,190

(22) PCT Filed: Apr. 22, 2020

(86) PCT No.: PCT/EP2020/061244
§ 371 (c)(1),
(2) Date: Oct. 6, 2021

(87) PCT Pub. No.: WO2020/221642
PCT Pub. Date: Nov. 5, 2020

(65) Prior Publication Data
US 2022/0194789 A1 Jun. 23, 2022

(30) Foreign Application Priority Data

May 2, 2019 (IN) .............................. 201911017599
Oct. 15, 2019 (DK) .................................. 2019 01210

(51) Int. Cl.
*C01B 3/40* (2006.01)
*B01D 53/00* (2006.01)
(Continued)

(52) U.S. Cl.
CPC ............ *C01B 3/40* (2013.01); *B01D 53/1487* (2013.01); *B01D 53/1493* (2013.01);
(Continued)

(58) Field of Classification Search
CPC ........ F25J 3/00; F25J 3/06; F25J 3/063; F25J 3/067; F25J 2260/00; F25J 2260/60;
(Continued)

(56) References Cited

U.S. PATENT DOCUMENTS 8,187,363 B2   5/2012   Grover
8,715,617 B2   5/2014   Genkin et al.
(Continued)

FOREIGN PATENT DOCUMENTS

CN   101111453 A   1/2008
CN   104203811 A   12/2014
(Continued)

OTHER PUBLICATIONS

Danish Search Report issued in corresponding Application No. PA 2019 01210 dated Feb. 7, 2020.
(Continued)

*Primary Examiner* — Natasha E Young
(74) *Attorney, Agent, or Firm* — Boone IP Law

(57) ABSTRACT

A plant and process for producing a hydrogen rich gas are provided, said process comprising the steps of: reforming a hydrocarbon feed in a reforming step thereby obtaining a synthesis gas comprising $CH_4$, $CO$, $CO_2$, $H_2$ and $H_2O$; shifting said synthesis gas in a shift configuration including a high temperature shift step; removal of $CO_2$ upstream hydrogen purification unit, such as a pressure swing adsorption unit (PSA), and recycling off-gas from hydrogen purification unit and mix it with natural gas upstream prereformer feed preheater, prereformer, reformer feed preheater or ATR or shift as feed for the process.

26 Claims, 2 Drawing Sheets

(51) Int. Cl.
| | |
|---|---|
| *B01D 53/047* | (2006.01) |
| *B01D 53/14* | (2006.01) |
| *B01D 53/22* | (2006.01) |
| *B01J 19/24* | (2006.01) |
| *B01J 21/04* | (2006.01) |
| *B01J 23/06* | (2006.01) |
| *C01B 3/48* | (2006.01) |
| *C01B 3/50* | (2006.01) |
| *C01B 3/52* | (2006.01) |
| *C01B 3/56* | (2006.01) |
| *F25J 3/06* | (2006.01) |

(52) U.S. Cl.
CPC ............ *B01D 53/22* (2013.01); *B01J 19/245* (2013.01); *B01J 21/04* (2013.01); *B01J 23/06* (2013.01); *C01B 3/48* (2013.01); *C01B 3/501* (2013.01); *C01B 3/506* (2013.01); *C01B 3/52* (2013.01); *C01B 3/56* (2013.01); *F25J 3/067* (2013.01); *B01D 53/002* (2013.01); *B01D 53/047* (2013.01); *B01D 2252/103* (2013.01); *C01B 2203/0244* (2013.01); *C01B 2203/0283* (2013.01); *C01B 2203/0405* (2013.01); *C01B 2203/0415* (2013.01); *C01B 2203/048* (2013.01); *C01B 2203/0816* (2013.01); *C01B 2203/0827* (2013.01); *C01B 2203/1076* (2013.01); *C01B 2203/1235* (2013.01); *C01B 2203/142* (2013.01); *C01B 2203/148* (2013.01); *C01B 2203/1614* (2013.01); *C01B 2203/169* (2013.01); *F25J 2260/60* (2013.01)

(58) Field of Classification Search
CPC ........ Y02C 20/00; Y02C 20/40; Y02C 20/50; Y02C 20/52; B01J 19/00; B01J 19/24; B01J 19/245; B01J 21/00; B01J 21/02; B01J 21/04; B01J 23/00; B01J 23/06
See application file for complete search history.

(56) References Cited

U.S. PATENT DOCUMENTS

| | | | |
|---|---|---|---|
| 9,028,794 | B2 | 5/2015 | Darde et al. |
| 9,481,573 | B2 | 11/2016 | Vakil et al. |
| 2004/0028595 | A1 | 2/2004 | Davey et al. |
| 2008/0272340 | A1 | 11/2008 | Koh |
| 2010/0074829 | A1 | 3/2010 | Koss |
| 2010/0260657 | A1 | 10/2010 | Niitsuma et al. |
| 2012/0141367 | A1 | 6/2012 | Wynn et al. |
| 2013/0243686 | A1 | 9/2013 | Genkin et al. |
| 2018/0237297 | A1 | 8/2018 | Duncan et al. |
| 2019/0039886 | A1 | 2/2019 | Krøll et al. |

FOREIGN PATENT DOCUMENTS

| | | | | |
|---|---|---|---|---|
| CN | 108883929 A | | 11/2018 | |
| EP | 2103569 B1 | | 4/2015 | |
| WO | 2011077107 A1 | | 6/2011 | |
| WO | WO-2017134162 A1 | * | 8/2017 | ............. B01J 21/04 |
| WO | 2018162576 A1 | | 9/2018 | |

OTHER PUBLICATIONS

International Search Report (PCT/ISA/210) and Written Opinion (PCT/ISA/237) mailed on Aug. 3, 2020, by the European Patent Office as the International Searching Authority for International Application No. PCT/EP2020/061244.

International Preliminary Report on Patentability received for PCT Patent Application No. PCT/EP2020/061244, mailed on Nov. 11, 2021, 9 pages.

Office Action received for Chinese Patent Application No. 202080032748.3, mailed on Dec. 8, 2023, 13 pages (4 pages of English Translation and 9 pages of Original Document).

* cited by examiner

ATR-BASED HYDROGEN PROCESS AND PLANT

This application is a national stage application, under 35 U.S.C. § 371, of PCT/EP2020/061244, now WO 2020/221642, filed Apr. 22, 2020, which claims benefit of Indian Application No. IN201911017599, filed May 2, 2019 and Danish Application No. DKPA 201901210, filed on Oct. 15, 2019, the content of which are incorporated herein by reference in their entirety.

FIELD OF THE INVENTION

The present invention relates to a plant and process for the production of hydrogen from a hydrocarbon feed comprising reforming, shift conversion, $CO_2$-removal and hydrogen purification. In particular, the present invention concerns a plant and process for producing hydrogen from a hydrocarbon feed, in which the hydrocarbon feed is subjected to reforming in an autothermal reformer (ATR) for generating a synthesis gas, subjecting the synthesis gas to shift conversion step in a shift section including one or more shift steps for enriching the synthesis gas in hydrogen, subjecting the shifted gas to a carbon dioxide removal step and then treating the shifted gas in a hydrogen purification unit, such as a pressure swing adsorption (PSA) unit, whereby a $H_2$-rich stream is produced as well as a PSA-off-gas stream, and where at least a portion of the off-gas is recycled to the ATR, and/or to the shift section, and/or mixed with natural gas upstream a prereforming unit.

BACKGROUND

Following today's demand and competitiveness in hydrogen production, significant efforts have been put into developing optimized production for hydrogen plants, with the objective to improve overall energy efficiency and reduce capital cost. The need for more cost-efficient hydrogen production has spurred the development of technology and catalysts for large-scale hydrogen production units, in order to benefit from economy of scale.

Topsøe's latest innovations within hydrogen production technology and the development of a new generation of state-of-the-art catalysts ensures highly cost efficient hydrogen production and high plant reliability also for large single line capacities.

U.S. Pat. No. 9,028,794 discloses a method for producing hydrogen with reduced carbon dioxide emissions from a hydrocarbon mixture. The hydrocarbon mixture is reformed so as to produce a synthesis gas that is cooled, then treated in a shift reactor so as to be enriched with $H_2$ and $CO_2$. Optionally dried, said mixture is treated in a PSA hydrogen purification unit in order to produce hydrogen. The PSA-off gas is thus further treated in a second shift step and optionally also passed through another PSA.

U.S. Pat. No. 9,481,573 discloses a method of re-distributing $CO_2$ balance from reformer furnace flue gas to the high pressure syngas exit water gas shift reaction unit, comprising: using a primary reformer (i.e. conventional steam methane reformer, SMR), shift, amine wash to remove $CO_2$, a low recovery PSA to produce hydrogen and a PSA purge gas (PSA-off gas) which is recycled to the reformer furnace as fuel such that no additional supplemental fuel to the reformer furnace is required. By low recovery is meant hydrogen recovery between about 50 and 65%.

EP 2103569 B1 discloses a method for generating hydrogen and/or syngas in a production facility where little or no export steam is produced. Most or all of the steam produced from the waste heat from the process is used in the steam-hydrocarbon reformer. Reformed gas is passed through a shift conversion step, $CO_2$-removal step and then to a pressure swing adsorption system for H2 purification. $CO_2$ is removed from the pressure swing adsorber residual gas (PSA-off gas) prior to recycling the residual gas to the reformer for use as feed and as fuel. A portion of the PSA-off gas may be used in the shift section.

U.S. Pat. No. 8,187,363 discloses a process for improving the thermodynamic efficiency of a hydrogen generation system. This includes producing a syngas stream in a reformer, wherein the reformer has a combustion zone. The patent includes introducing a syngas stream into a pressure swing adsorption unit, thereby producing a product hydrogen stream and a tail gas stream. The patent also includes heating the tail gas stream by indirect heat exchange with a heat source, thereby producing a heated tail gas stream; and introducing the heated tail gas stream into the combustion zone of the reformer.

US 2018237297 discloses a method for obtaining a hydrogen rich gas from a natural gas comprising gas stream comprising: (1) feeding said natural gas comprising gas and an appropriate amount of steam to a reforming unit comprising at least a steam methane reformer (SMR) and optionally a pre-reforming reactor up stream of the SMR, obtaining a first effluent; (2) feeding said first effluent and optionally an appropriate amount of steam through a high, medium or low temperature shift reactor(s) or a combination thereof to convert at least part of the carbon monoxide and water into hydrogen and carbon dioxide, to obtain a second effluent; (3) optionally, removing bulk water from the second effluent obtained in steps (1) or (2); (4) feeding the second effluent of step (2) and/or (3) through a pressure swing adsorption (PSA) unit operated such that a hydrogen rich gas stream is obtained wherein an off gas is added to the natural gas comprising gas stream and/or the first effluent obtained in step (1), wherein the off gas provided upstream of the reforming unit is mixed with steam prior to being added to the natural gas comprising gas stream.

U.S. Pat. No. 8,715,617 discloses a hydrogen production process wherein steam and a hydrocarbon feed is reacted in a prereformer, the prereformed intermediate is further reacted in an oxygen-based reformer, the reformate is shifted and then separated by a pressure swing adsorber having a plurality of adsorption beds to form a $H_2$ product stream and a tail gas, a first portion of the tail gas is recycled to the prereformer and/or the oxygen-based reformer, and a second portion of the tail gas is recycled to the pressure swing adsorber.

SUMMARY

It is an object of the present invention to reduce consumption of hydrocarbon feed and fuel in a hydrogen plant and/or process, thereby increasing energy efficiency.

It is another object of the present invention to provide a plant and/or process with overall lower investment and operating costs compared to plants based on steam methane reformers (tubular reformers), and without compromising energy efficiency.

These and other objects are solved by the present invention.

Accordingly, in a first aspect, there is provided a plant for producing a $H_2$-rich stream from a hydrocarbon feed is provided. The plant comprises:

an autothermal reformer (ATR), said ATR being arranged to receive a hydrocarbon feed and convert it to a stream of syngas;

a shift section, said shift section comprising a high temperature shift unit, said high temperature shift unit being arranged receive a stream of syngas from the ATR and shift it in a high temperature shift step, thereby providing a shifted syngas stream;

a $CO_2$ removal section, arranged to receive the shifted syngas stream from said shift section and separate a CO2-rich stream from said shifted syngas stream, thereby providing a $CO_2$-depleted shifted syngas stream, a hydrogen purification unit, arranged to receive said $CO_2$-depleted shifted syngas stream, from said $CO_2$ removal section, and separate it into a high-purity $H_2$ stream and an off-gas stream;

wherein said plant is arranged to feed at least a part of the off-gas stream from said hydrogen purification unit as an off-gas recycle stream to the feed side of the ATR, and/or wherein said plant is arranged to feed at least a part of the off-gas stream from said hydrogen purification unit as an off-gas recycle stream to the feed side of the shift section, and/or wherein said plant further comprises at least one prereformer unit arranged upstream the ATR, said prereformer unit being arranged to pre-reform said hydrocarbon feed prior to it being fed to the ATR and wherein said plant is arranged to feed at least a part of the off-gas stream from said hydrogen purification unit as an off-gas recycle stream to the feed side of the prereformer unit.

As used herein, the term "feed side" means inlet side or simply inlet. For instance, the feed side of the ATR means the inlet side of the ATR, the feed side of the shift section means the inlet side of the high temperature shift unit or the inlet side of any downstream shift unit downstream in said shift section, such as a medium temperature shift unit.

As used herein, the term $CO_2$-rich stream means a stream containing 95% vol. or more, for instance 99.5% of carbon dioxide. The $CO_2$-depleted shifted gas stream means a stream containing 1000 ppm carbon dioxide or less, for instance 500 ppmv carbon dioxide or 50 ppmv.

As used herein, the terms prereformer, prereformer unit and prereforming unit, are used interchangeably.

Also provided, in a second aspect of the invention, as recited farther below, is a process for producing a $H_2$-rich stream from a hydrocarbon feed, using the plant as defined herein.

By the invention, the reforming section comprises an ATR and optionally also a pre-reforming unit, yet there is no steam methane reforming (SMR) unit, i.e. the use of a conventional SMR (also normally referred as radiant furnace, or tubular reformer) is omitted.

This conveys significant advantages in terms of energy consumption and plant size since it is now possible, among other things, to operate at steam to carbon molar ratios well below 1 and thereby significantly reducing the amount of steam carried in the plant/process.

Recycling of the off-gas recycle stream to the ATR has the advantage of possibly reducing the flow to the prereformer, and thereby reducing its size. More specifically, the recycling of off-gas increases the hydrogen recovery and thereby the feed consumption is reduced. Due to this the upstream equipment may reduce in size Recycling of the off-gas recycle stream to the shift section has the advantage of reducing the size of both ATR and prereformer. This recycle option is preferably combined with a second $H_2$ purification step on the off-gas to reduce $H_2$ partial pressure.

Further details of the invention are set out in the following description, following figures, aspects and the dependent claims.

In an embodiment according to the first aspect of the invention, as mentioned above, the plant is without i.e. is absent of a steam methane reformer unit (SMR) upstream the ATR.

In an embodiment according to the first aspect of the invention, the plant comprises two or more adiabatic prereformers arranged in series with interstage preheater(s) i.e. in between prereformer preheater(s).

In an embodiment according to the first aspect of the invention, said off-gas recycle stream is mixed with hydrocarbon feed before being fed to the feed side of the ATR. It would thus be understood, that the off-gas recycle can be led directly to e.g. the ATR, and/or being mixed with hydrocarbon feed before entering the ATR.

In another embodiment according to the first aspect of the invention, said off-gas recycle stream is mixed with hydrocarbon feed before being fed to the feed side of the prereformer unit.

In an embodiment according to the first aspect of the invention, said plant further comprises a hydrogenator unit and a sulfur absorption unit arranged upstream said at least one pre-reformer unit, wherein said plant is arranged to feed at least a part of the off-gas stream from said hydrogen purification unit as an off-gas recycle stream to the feed side of the hydrogenator unit.

In another embodiment according to the first aspect of the invention, said plant further comprises a hydrogen-recycling compressor for feeding a portion of said high-purity H2 stream into said hydrocarbon feed prior to it being fed to the feed side of said at least one pre-reformer unit or prior to it being fed to the feed side of said hydrogenator. Thereby, the energy consumption is further reduced, as hydrogen produced in the process is used in the main hydrocarbon feed prior to it entering the hydrogenator instead of using external hydrogen sources. In other words, the addition of hydrogen to the main hydrocarbon feed further increases the energy efficiency of the plant and process.

Preferably, said plant further comprises a compressor i.e. off-gas recycle compressor arranged for compressing said off-gas recycle stream prior to it being fed to the feed side of the ATR, or to the feed side of the shift section, or to the feed side of the prereformer unit, or prior to it being mixed with hydrocarbon feed before being fed to the feed side of the ATR, or prior to it being mix mixed with hydrocarbon feed before being fed to the feed side of the prereformer unit, or prior to it being fed to the feed side of the hydrogenator unit. At least a part of the compressed part of the off-gas stream, i.e. the off-gas recycle stream, is used in the process by directly becoming a part of the hydrocarbon feed or process gas being treated in the prereformer, or ATR, or shift section. The uncompressed portion of the off-gas recycle stream is used as fuel for example for the fired heater(s).

In another embodiment according to the first aspect of the invention, the high temperature shift unit comprises a promoted zinc-aluminium oxide based high temperature shift catalyst, preferably arranged within said HTS unit in the form of one or more catalyst beds, and preferably wherein the promoted zinc-aluminum oxide based HT shift catalyst comprises in its active form a Zn/Al molar ratio in the range 0.5 to 1.0 and a content of alkali metal in the range 0.4 to 8.0 wt % and a copper content in the range 0-10% based on the weight of oxidized catalyst.

In a conventional hydrogen plant the standard use of iron based high temperature shift catalyst re-quires a steam/carbon ratio of around 3.0 to avoid iron carbide formation.

Formation of iron carbide will weaken the catalyst pellets and may result in catalyst disintegration and pressure drop increase.

Iron carbide will catalyse Fischer-Tropsch by-product formation

The Fischer-Tropsch reactions consume hydrogen, whereby the efficiency of the shift section is reduced.

However, according to the present invention a non Fe-catalyst is used, such as a promoted zinc-aluminum oxide based catalyst. For example, the Topsøe SK-501 Flex™ HT shift catalyst which enables operation of the reforming section and high temperature shift section at a steam/carbon ratio down to 0.3.

Thus, the present plant and/or process operating at a steam/carbon ratio down to 0.3 is in contrast to today's traditional hydrogen plants which are based on reforming and/or shift sections operating at a steam/carbon ratio of around 1.5 or higher. In advantageous embodiments of the process the zinc-aluminum oxide based catalyst in its active form comprises a mixture of zinc aluminum spinel and zinc oxide in combination with an alkali metal selected from the group consisting of Na, K, Rb, Cs and mixtures thereof, and optionally in combination with Cu. The catalyst, as recited above, may have a Zn/Al molar ratio in the range 0.5 to 1.0, a content of alkali metal in the range 0.4 to 8.0 wt % and a copper content in the range 0-10% based on the weight of oxidized catalyst.

The high temperature shift catalyst used according to the present process is not limited by strict requirements to steam to carbon ratios, which makes it possible to reduce steam/carbon ratio in the shift section as well as in the reforming section.

Again, significant reduction in the amount of steam carried in the plant and/or process is obtained, thereby reducing plant size and energy consumption. More specifically, a steam/carbon ratio of less than 2.0 has several advantages. Reducing steam/carbon ratio on a general basis leads to reduced feed plus steam flow through the reforming section and the downstream cooling and hydrogen purification sections. Low steam/carbon ratio in the reforming section and shift section enables also higher syngas throughput compared to high steam/carbon ratio. Reduced mass flow through these sections means smaller equipment and piping sizes. The reduced mass flow also results in reduced production of low temperature calories, which can often not be utilised. This means that there is a potential for both lower CapEx (Capital Expenditure) and OpEx (Operating Expenses).

As the requirements to the steam/carbon ratio in the high temperature shift step by the present process is significantly reduced compared to known technologies, it is possible by the present invention to reduce steam/carbon ratio through the front-end to e.g. 0.6 or as low as possible dependent on the possible shift solutions, as further explained below. An advantage of a low steam/carbon ratio to the ATR and in the overall process is that smaller equipment is required in the front-end due to the lower total mass flow through the plant.

It would be understood that the term "front-end" means the reforming section. It would also be understood that the reforming section is the section of the plant comprising units up to and including the ATR, i.e. the ATR, or a pre-reformer unit and the ATR, or hydrogenator and sulfur absorber and a pre-reformer unit and ATR.

The plant preferably comprises also an air separation unit (ASU) which is arranged for receiving an air stream and produce an oxygen stream which is then fed through a conduit to the ATR.

The plant preferably comprises also conduits for the addition of steam to the main hydrocarbon feed, to the oxygen comprising stream and to the ATR, and optionally also to the inlet of the reforming section e.g. to the main hydrocarbon feed, and also to the inlet of the shift section in particular to the HTS unit, and/or to additional shift units downstream the HTS unit, as it will be described farther below.

In another embodiment according to the first aspect of the invention, said reforming section further comprises at least one fired heater, arranged to pre-heat said hydrocarbon feed prior to it being fed to the ATR. In a particular embodiment, said plant is arranged to feed at least a part of the off-gas stream from said hydrogen purification unit as fuel for said fired heater. The off-gas stream may also be used as fuel for steam superheaters.

The term "at least a part of the off-gas stream from said hydrogen purification unit" means the uncompressed part of the off-gas stream, as also explained above. This stream is then used as fuel for the at least one fired heater and is used preferably together with separate fuel gas and combustion air. The fired heater, apart from preheating the hydrocarbon feed gas to the prereformer and ATR, may also be used for example for superheating steam.

In another embodiment according to the first aspect of the invention, the hydrogen purification unit is selected from a pressure swing adsorption (PSA) unit, a hydrogen membrane or a cryogenic separation unit, preferably a PSA.

In another embodiment according to the first aspect of the invention, the $CO_2$ removal section is selected from an amine wash unit, or a $CO_2$ membrane i.e. $CO_2$ membrane separation unit, or a cryogenic separation unit, preferably an amine wash unit.

In particular, when using a $CO_2$ membrane, the permeate is the stream richer in hydrogen and which is then passed to hydrogen purification unit, e.g. PSA unit, while the retentate is a hydrogen-lean stream which is recycled to the feed side of the ATR, or feed side of shift section, or the feed side i.e. inlet side of the membrane separation.

The $CO_2$ removal section can also be a Benfield process or plant comprising an absorber for conducting a gas absorbing step and a regenerator for conducting a carbonate regeneration step. The $CO_2$ removal section can also be in the form of a $CO_2$ PSA, as is also well known in the art.

In many advantageous embodiments, a $CO_2$ removal step may be carried out after/downstream the one or more shift steps. Removing the $CO_2$ from the synthesis gas (shifted synthesis gas) reduces the size of the hydrogen purification section. The off-gas from the hydrogen purification section or hydrogen purification unit, e.g. PSA unit, will be free from or lean in $CO_2$ thus increasing its heating value and fuel efficiency. The off-gas may be exported as a low $CO_2$ containing fuel gas. The off-gas may be used as fuel in a fired heater for steam production at low $CO_2$ emission. Since the $CO_2$ has been removed from the off-gas it may be recycled to i.a. inlet of the prereformers, inlet prereformer preheater, inlet ATR or inlet ATR preheater. Recycling the $CO_2$ depleted off-gas from hydrogen purification section reduces the consumption of feed gas to the unit. It also reduces steam export if the off-gas was otherwise used as fuel in a fired heater for steam production. Not least, it enables the plant and process to operate with reduced CO2 emissions. In standard design the $CO_2$ content is 500 ppmv or even lower such as 50 ppmv, in the treated gas, i.e. in the CO2-depleted shifted syngas, as mentioned previously.

Hence, by the present invention carbon dioxide can be prepared having a quality that allows it to be reused or stored, thus reducing overall $CO_2$ emission in the plant and/or process. While there may be a small slip of carbon dioxide through the burning of off-gas, by the invention it is possible to remove close to 100% CO2.

In preferred embodiments a $CO_2$ removal step may be used to bring the $CO_2$ content down to less than 500 or 400 ppmv $CO_2$, such as below 100 ppmv or in some preferred embodiments down to 50 ppmv or 20 ppmv or below.

The $CO_2$ from the $CO_2$ removal step may be vented to atmosphere or captured and used for other purposes to reduce the $CO_2$ emission to atmosphere.

After the one or more shift sections and $CO_2$ removal unit the gas may contain residual CO and $CO_2$ together with small amounts of $CH_4$, Ar, He and $H_2O$.

In another embodiment according to the first aspect, the shift section (20) comprises one or more additional high temperature shift units in series.

In another embodiment according to the first aspect, said shift section further comprises one or more additional shift units downstream the high temperature shift unit. In a particular embodiment, the one or more additional shift units are one or more medium temperature shift units and/or one or more low temperature shift units.

The provision of additional shifts units or shifts steps adds flexibility to the plant and/or process when operation at low steam/carbon ratios. The low steam/carbon ratio may result in a lower than optimal shift conversion which means that in some embodiments it may be advantageous to provide one or more additional shift steps. The one or more additional shift steps may include a medium temperature (MT) shift and/or a low temperature (LT) shift and/or a high temperature shift. Generally speaking, the more converted CO in the shift steps the more gained $H_2$ and the smaller front end required.

This is also seen from the exothermic shift reaction:
$CO+H_2O \leftrightarrow CO_2+H_2+heat$ As recited above, steam may optionally be added before and after the high temperature shift step such as before one or more following MT or LT shift and/or HT shift steps in order to maximize performance of said following HT, MT and/or LT shift steps.

Having two or more high temperature shift steps in series (such as a high temperature shift step comprising two or more shift reactors in series e.g. with the possibility for cooling and/or steam addition in between) may be advantageous as it may provide increased shift conversion at high temperature which gives a possible reduction in required shift catalyst volume and therefore a possible reduction in CapEx. Furthermore, high temperature reduces the formation of methanol, a typical shift step byproduct.

Preferably the MT and LT shift steps may be carried out over promoted copper/zinc/alumina catalysts. For example, the low temperature shift catalyst type may be LK-821-2, which is characterized by high activity, high strength, and high tolerance towards sulphur poisoning. A top layer of a special catalyst may be installed to catch possible chlorine in the gas and to prevent liquid droplets from reaching the shift catalyst.

The MT shift step may be carried out at temperatures at 190-360° C.

The LT shift step may be carried out at temperatures at $T_{dew}$+15-290° C., such as, 200-280° C. For example, the low temperature shift inlet temperature is from $T_{dew}$+15-250° C., such as 190-210° C.

Reducing the steam/carbon ratio leads to reduced dew point of the process gas, which means that the inlet temperature to the MT and/or LT shift steps can be lowered. A lower inlet temperature can mean lower CO slippage outlet the shift reactors, which is also advantageous for the plant and/or process.

It is well known that MT/LT shift catalysts are prone to produce methanol as byproduct. Such byproduct formation can be reduced by increasing steam/carbon. The $CO_2$ wash which may follow the MT/LT shifts requires heat for regeneration of the $CO_2$ absorption solution. This heat is normally provided as sensible heat from the process gas but this is not always enough. Typically, an additionally steam fired reboiler is providing the makeup duty. Optionally adding steam to the process gas can replace this additionally steam fired reboiler and simultaneously ensures reduction of byproduct formation in the MT/LT shift section.

Accordingly, in another embodiment according to the first aspect of the invention, the plant further comprises a methanol removal section arranged between the shift section and said $CO_2$ removal section, said methanol removal section being arranged to separate a methanol-rich stream from said shifted syngas stream. The methanol formed by the MT/LT shift catalyst can optionally be removed from the synthesis gas in a water wash to be placed upstream the $CO_2$ removal step or in the $CO_2$ product stream.

In another embodiment according to the first aspect of the invention, the CO2 removal section is a $CO_2$ membrane, said $CO_2$ membrane is arranged to produce a hydrogen-rich permeate stream for further enrichment in said hydrogen purification unit and a hydrogen-lean retentate stream, wherein said plant is arranged to feed at least a part of the hydrogen-lean retentate stream from said $CO_2$ membrane as a hydrogen recycle stream to the feed side of the ATR, and/or wherein said plant is arranged to feed at least a part of the hydrogen-lean retentate stream from said $CO_2$ membrane as a hydrogen recycle stream to the feed side of the shift section. Also, the plant may be arranged to feed at least a part of the hydrogen-lean retentate stream from said $CO_2$ membrane as a hydrogen recycle stream to the inlet of the $CO_2$ membrane.

In another embodiment according to the first aspect of the invention, the $CO_2$ removal section is a cryogenic separation unit, said cryogenic separation unit is arranged to produce a cryogenic unit off-gas stream and said $CO_2$-depleted shifted syngas stream,
  wherein said plant is arranged to feed at least a part of the
    off-gas stream from said cryogenic separation unit as a
    cryogenic off-gas recycle stream to the feed side of the
    ATR,
  and/or wherein said plant is arranged to feed at least a part
    of the off-gas stream from said cryogenic separation
    unit as a cryogenic off-gas recycle stream to the feed
    side of the shift section,
  and/or wherein said plant is arranged to feed at least a part
    of the off-gas stream from said cryogenic separation
    unit as a cryogenic off-gas recycle stream to the feed
    side i.e. inlet of said cryogenic separation unit.

In another embodiment according to the first aspect of the invention, said plant further comprises a compressor i.e. off-gas recycle compressor (compressor for the off-gas stream from the hydrogen purification unit) arranged for compressing said off-gas recycle stream, and a membrane separation unit for separating the thus compressed off-gas recycle stream into a permeate membrane stream and a retentate membrane stream, said compressor being adapted upstream said membrane separation unit, said permeate membrane stream being hydrogen rich,
and
said plant is arranged for recycling said permeate membrane stream, optionally via a compressor, to the feed side i.e. inlet of the hydrogen purification unit, and/or said plant is arranged for mixing said permeate membrane stream with said high purity hydrogen stream from the hydrogen purification unit, and for recycling said membrane retentate as fuel for said at least one fired heater.

In another embodiment according to the first aspect of the invention, said plant further comprises a compressor i.e. off-gas recycle compressor (compressor for the off-gas stream from the hydrogen purification unit) arranged for compressing said off-gas recycle stream, and a $CO_2$ separation unit for removal of $CO_2$ from the thus compressed off-gas recycle stream into a $CO_2$-rich off-gas stream and a $CO_2$-lean off-gas stream, said compressor being adapted upstream said $CO_2$ separation unit,
and
said plant is arranged for recycling said $CO_2$-lean off-gas stream, optionally via a compressor, to the feed side of the ATR, and/or to the feed side of the shift section, and/or to the feed side of the hydrogen purification unit, and/or as fuel for said at least one fired heater.

In a second aspect of the invention, there is also provided a process for producing a $H_2$-rich stream from a hydrocarbon feed, said process comprising the steps of:
providing a plant as defined herein,
supplying a hydrocarbon feed to the ATR, and converting it to a stream of syngas;
supplying a stream of syngas from the ATR to the shift section, and shifting it in a high temperature shift step, thereby providing a shifted syngas stream;
supplying the shifted gas stream from the shift section to the $CO_2$ removal section, and separating a $CO_2$-rich stream from said shifted syngas stream, thereby providing a $CO_2$-depleted shifted syngas stream,
supplying said $CO_2$-depleted shifted syngas stream from said $CO_2$ removal section to a hydrogen purification unit, and separating it into a high-purity $H_2$ stream and an off-gas stream; and,
feeding at least a part of the off-gas stream from said hydrogen purification unit as an off-gas recycle stream to the feed side of ATR,
and/or feeding at least a part of the off-gas stream from said hydrogen purification unit as an off-gas recycle stream to the feed side of the shift section (20),
and/or wherein said plant further comprises at least one preformer arranged upstream the ATR, being arranged to pre-reform said hydrocarbon feed prior to it being fed to the ATR; feeding at least a part of the off-gas stream from said hydrogen purification unit as an off-gas recycle stream to the feed side of the preformer unit.

A fired heater is used for preheating the main hydrocarbon (natural gas) feed, main hydrocarbon feed to prereforming unit e.g. after being passed through a hydrogenator and sulfur absorber, the hydrocarbon feed to the ATR and for steam generation and steam superheating. The necessary heat is thus generated by burning a mixture of natural gas, fuel gas and off-gas from the hydrogen purification units, e.g. PSA-units.

In another embodiment according to the second aspect of the invention, the process further comprises pre-reforming said main hydrocarbon feed in at least one pre-reforming unit to form a hydrocarbon feed prior to it being fed to the ATR, and mixing a portion of said first high-purity $H_2$ stream with main hydrocarbon feed before being fed to the feed side of said at least one pre-reforming unit.

Preferably one or more prereforming units are provided as part of the reforming section and upstream the ATR. In the prereforming unit(s) all higher hydrocarbons can be converted to carbon oxides and methane, but the prereforming unit(s) are also advantageous for light hydrocarbons. Providing the prereforming unit(s), hence prereforming step(s), may have several advantages including reducing the required $O_2$ consumption in the ATR and allowing higher inlet temperatures to the ATR since cracking risk by preheating is minimized. Furthermore, the prereforming unit(s) may provide an efficient sulphur guard resulting in a practically sulphur free feed gas entering the ATR and the downstream system. The prereforming step(s) may be carried out at temperatures between 300-650° C., preferably 390-480° C. Preferably, the prereforming is conducted in one or more adiabatic prereforming stages with interstage preheating, i.e. with heating in between prereforming stages.

In another embodiment according to the second aspect of the invention, the steam/carbon ratio of the synthesis gas supplied from the ATR to the shift section is less than 2.0 preferably 0.3-1.0.

As recited above in connection with the first aspect of the invention, the present plant and/or process operates at steam/carbon rations down to 0.3. Low steam/carbon ratio in the reforming section and the shift section (i.e. optionally including any steam added to the shift section) enables higher syngas throughput compared to high steam/carbon ratio.

In another embodiment according to the second aspect of the invention, the temperature in the high temperature shift step is in the range 300-600° C., such as 360-470° C., or such as 345-550° C. This means that according to the present process it is possible to run a high temperature shift reaction on a feed with much lower steam/carbon ratio than possible by known processes. For example, the high temperature shift inlet temperature may be 300-400° C., such as 350-380° C.

The carbon feed for the ATR is mixed with oxygen and additional steam in the ATR, and a combination of at least two types of reactions take place. These two reactions are combustion and steam reforming.

Combustion Zone:

$$2H_2+O_2 \leftrightarrow 2H_2O+\text{heat} \quad (3)$$

$$CH_4+3/2O_2 \leftrightarrow CO+2H_2O+\text{heat} \quad (4)$$

Thermal and Catalytic Zone:

$$CH_4+H_2O+\text{heat} \leftrightarrow CO+3H_2 \quad (5)$$

$$CO+H_2O \leftrightarrow CO_2+H_2+\text{heat} \quad (6)$$

The combustion of methane to carbon monoxide and water (reaction (4)) is a highly exothermic process. Excess methane may be present at the combustion zone exit after all oxygen has been converted.

The thermal zone is part of the combustion chamber where further conversion of the hydrocarbons proceeds by homogenous gas phase reactions, mostly reactions (5) and (6). The endothermic steam reforming of methane (5) consumes a large part of the heat developed in the combustion zone.

Following the combustion chamber there may be a fixed catalyst bed, the catalytic zone, in which the final hydrocarbon conversion takes place through heterogeneous catalytic reactions. At the exit of the catalytic zone, the synthesis gas preferably is close to equilibrium with respect to reactions (5) and (6).

The steam/carbon ratio in the reforming section may be 2.6-0.1, 2.4-0.1, 2-0.2, 1.5-0.3, 1.4-0.4, such as 1.2, 1.0 or 0.6. The steam/carbon ratio is defined as the ratio of all steam added to the reforming section upstream the shift section, e.g. the high temperature shift section, i.e. steam which may have been added to the reforming section via the feed gas, oxygen feed, by addition to the ATR and the hydrocarbons in the feed gas to the reforming section on molar basis. Hence, in yet another embodiment according to the second aspect of the invention, the steam to carbon ratio (steam to carbon ration from the reforming step) defined as the molar ratio of all steam added upstream the shift section to the carbon of the hydrocarbon feed, is 2.6-0.1, 2.4-0.1, 2-0.2, 1.5-0.3 or 1.4-0.4, such as 1.2 or 1 or, 0.6. The steam added upstream the shift section does not include any steam added to the synthesis gas supplied from the ATR. In other words, it includes only the steam added to the ATR and upstream the ATR.

Thus, according to the present invention it is possible to run the plant and/or process with no additional steam addition between the reforming step(s) and the high temperature shift step.

In another embodiment according to the second aspect of the invention, the space velocity in the ATR is low, such as less than 20000 $Nm^3$ $C/m^3/h$, preferably less than 12000 $Nm^3$ $C/m^3/h$ and most preferably less 7000 $Nm^3$ $C/m^3/h$. The space velocity is defined as the volumetric carbon flow per catalyst volume and is thus independent of the conversion in the catalyst zone.

In another embodiment according to the second aspect of the invention, the synthesis gas is washed with water to reduce the methanol content, preferably between the shift step and the $CO_2$-removal step.

In another embodiment according to the second aspect of the invention, the $CO_2$ depleted shifted gas stream comprises less than 500 or 400 ppmv $CO_2$, such as below 100 ppmv, or below 50 or 20 ppmv $CO_2$.

In another embodiment according to the second aspect of the invention, the process further comprises subjecting the one or more high-purity $H_2$ streams, i.e. here the high-purity $H_2$ stream from the hydrogen purification unit, to one or more hydrogen purification steps.

In another embodiment according to the second aspect of the invention, the $CO_2$ removal section is a $CO_2$-membrane producing i) said $CO_2$-depleted shifted syngas stream, said $CO_2$-depleted shifted syngas stream being a hydrogen-rich permeate stream for further hydrogen enrichment in said hydrogen purification unit, and ii) a hydrogen-lean retentate stream; and feeding at least a part of said hydrogen-lean retentate stream as a hydrogen recycle stream to the feed side of the ATR, and/or feeding at least a part of the hydrogen-lean retentate stream as a hydrogen recycle stream to the feed side of the shift section.

In another embodiment according to the second aspect of the invention, the $CO_2$ removal section is a cryogenic separation unit producing a cryogenic unit off-gas stream and said $CO_2$-depleted shifted syngas stream (7), and feeding at least a part of the off-gas stream from said cryogenic separation unit as a cryogenic off-gas recycle stream to the feed side of the ATR, and/or feeding at least a part of the off-gas stream from said cryogenic separation unit as a cryogenic off-gas recycle stream to the feed side of the shift section, and/or feeding at least a part of the off-gas stream from said cryogenic separation unit as a cryogenic off-gas recycle stream to the feed side i.e. inlet of said cryogenic separation unit.

In another embodiment according to the second aspect of the invention, the process further comprises a compressor i.e. off-gas recycle compressor (compressor for the off-gas stream from the hydrogen purification unit) thereby providing a step for compressing said off-gas recycle stream, and a membrane separation unit thereby providing a step for separating the thus compressed off-gas recycle stream into a permeate membrane stream and a retentate membrane stream, said compressing step being conducted prior to said membrane separating step, said permeate membrane stream being hydrogen rich, and recycling said permeate membrane stream, optionally via a compressing step, to the feed side i.e. inlet of the hydrogen purification unit, and/or mixing said permeate membrane stream with said high purity hydrogen stream from the hydrogen purification unit, and recycling said membrane retentate as fuel for said at least one fired heater.

In another embodiment according to the second aspect of the invention, said process further comprises a compressor i.e. off-gas recycle compressor (compressor for the off-gas stream from the hydrogen purification unit) thereby providing a step for compressing said off-gas recycle stream, and a $CO_2$ separation unit thereby providing a step for removing $CO_2$ from the thus compressed off-gas recycle stream into a $CO_2$-rich off-gas stream and a $CO_2$-lean off-gas stream, said compressing step being conducted prior to said $CO_2$ separation unit, and recycling said CO2-lean off-gas stream, optionally via a compressing step, to the feed side of the ATR, and/or feed side of the shift section, and/or feed side of the hydrogen purification unit, and/or as fuel for said at least one fired heater.

Any of the embodiments of the first aspect may be used in connection with any of the embodiments of the second aspect, or vice versa.

Hence, the invention according to the first or second aspect has at least the following technical advantages:

- a process and/or plant enabling a process scheme utilizing proven reforming technology operating with low steam/carbon ratio.
- a process and/or plant enabling operation of the high temperature shift (HTS) downstream the reforming section at the same low steam/carbon ratio as the reforming section.
- a process and/or plant enabling a process scheme with $CO_2$ removal and recycling of off-gas from the hydrogen purification unit as feed gas to the process, i.e. reforming process, or shift process.
- an overall plant and/or process layout enabling maximum line capacity.

a process and/or plant having a significant reduction in $CO_2$-emission, particularly when the imported energy is from renewable sources.

BRIEF DESCRIPTION OF THE FIGURES

FIG. 2 comprises the elements of FIG. 1, plus the additional steps of methanol removal and $CO_2$ removal and different feeding points of an off-gas stream from the hydrogen purification unit.

DETAILED DESCRIPTION

Figure 1:
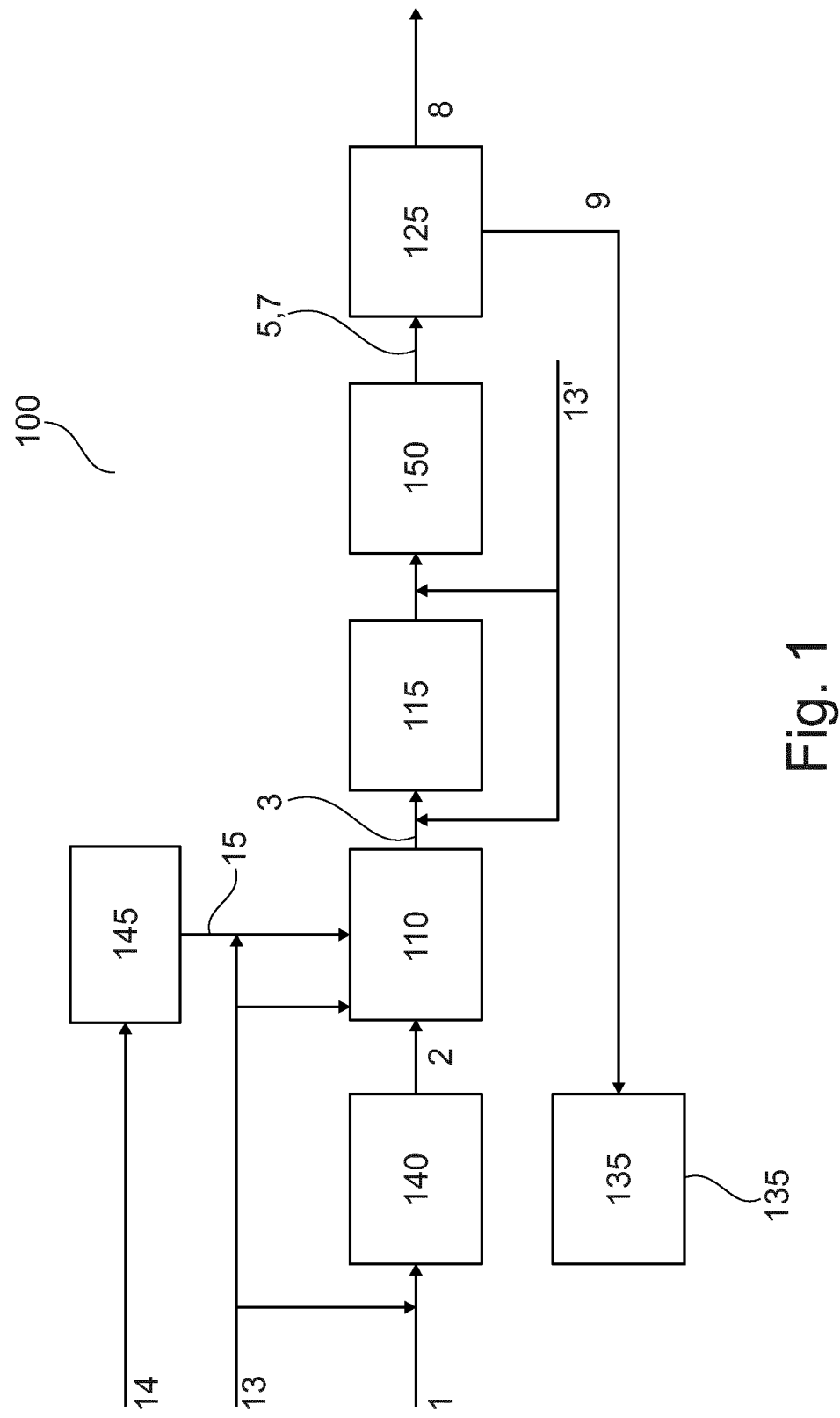
FIGS. 1 and 2 illustrate layouts of the ATR-based hydrogen process and plant.

FIG. 1 shows a plant 100 in which a hydrocarbon feed 1, i.e. main hydrocarbon feed 1, such as natural gas, is passed to a reforming section comprising a pre-reforming unit 140 and autothermal reformer 110. The reforming section may also include a hydrogenator and sulfur absorber unit (not shown) upstream the pre-reforming unit 140. The hydrocarbon steam 1 is mixed with steam 13 and optionally also with a portion of a hydrogen-rich stream 8 from a first hydrogen purification unit 125 located downstream. The resulting hydrocarbon feed 2 is fed to ATR 110, as so is oxygen 15 and steam 13. The oxygen stream 15 is produced by means of an air separation unit (ASU) 145, to which air 14 is fed. In the ATR 110, the hydrocarbon feed 2 is converted to a stream of syngas 3, which is then passed to a shift section. The hydrocarbon feed 2 enters the ATR at 650° C. and the temperature of the oxygen is around 253° C. The steam/carbon ratio of the synthesis gas 3 from the reforming is S/C=0.6. This syngas, i.e. process gas 3 leaves the reforming section at about 1050° C. through a refractory lined outlet section and transfer line to the waste heat boilers in the process gas cooling section.

The shift section comprises a high temperature shift (HTS) unit 115 where additional or extra steam 13' also may be added upstream. Additional shift units, such as a low temperature shift unit 150 may also be included in the shift section. Additional or extra steam 13' may also be added downstream the HTS unit 115 but upstream the low temperature shift unit 150. By way of example, in a shift section including high and medium/low temperature shift, the high temperature shift operates under the following conditions: HT shift: Tin/Tout: 330/465° C. (ΔT=135° C.); LT shift: Tin/Tout: 195/250° C. (ΔT=55° C.). After reforming, about 28.3 vol % CO is present in the syngas 3 (dry basis). In the high temperature shift converter, the CO content is reduced to approximately 7.6 vol %, and the temperature increases from 330° C. to 465° C. The heat content of the effluent from the high temperature CO converter is recovered in a waste heat boiler and in a boiler feed water preheater. The process gas from the high shift converter is thereby cooled to 195° C. and passed on to the medium/low temperature shift converter in which the CO content is reduced to approximately 1.0 vol %, while the temperature increases to 250° C.

From the shift section, a shifted gas stream 5 is thus produced, which is then fed to a CO2-removal section (not shown). The $_{CO2}$-removal section separates a $_{CO2}$-rich stream from the syngas stream (5), thereby providing a CO2-depleted syngas stream (7). This syngas stream (7) is then fed to a hydrogen purification unit 125, e.g. a PSA-unit, from which a high purity $H_2$ stream 8 and an off-gas recycle stream 9 is produced. This off-gas recycle stream 9 serves as fuel for a fired heater 135 and optionally also as fuel for steam superheaters. The fired heater 135 provides for the indirect heating of hydrocarbon feed 1 and hydrocarbon feed 2. Preferably, the off-gas recycle stream 9 to the fired heater is the uncompressed portion of the off-gas stream which has been passed through an off-gas recycle compressor (not shown).

Figure 2:
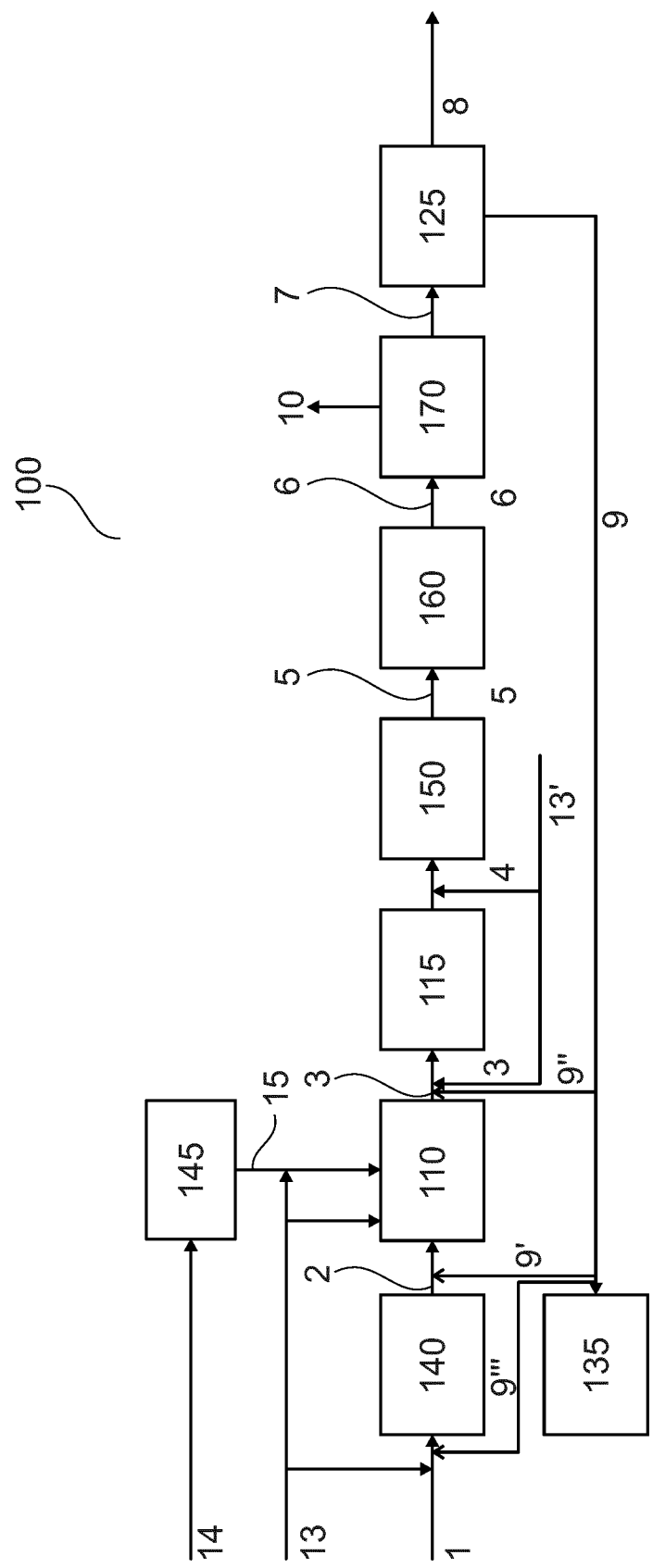

FIG. 2 shows specific embodiments of the invention in addition to the elements of FIG. 1, in the form of a methanol removal and water wash section 160 and $CO_2$-removal section 170, as well as feeding points of the off-gas 9 from the hydrogen purification unit 125.

From the shift section, a shifted gas stream 5 is produced, which is fed to the optional methanol removal and water wash section 160, thereby producing a feed syngas stream 6 which is then fed to the $CO_2$-removal section 170 comprising e.g. a $CO_2$-absorber and a CO2-stripper. In the $CO_2$-removal section 170, the $CO_2$ content in the outlet stream from shift section (shifted gas stream 5) is reduced to 20 ppmv. All methanol in the synthesis gas going to the $CO_2$ removal section will leave this section with the process condensate and the $CO_2$ product stream. A water wash on the synthesis gas 5 going to the $CO_2$ removal section or on the $CO_2$ product stream can minimize the methanol content in the $CO_2$ product stream 10. The CO2-removal section separates such $CO_2$-rich stream 10 from the syngas stream 5, thereby providing a CO2-depleted syngas stream 7. This syngas stream 7 is then fed to a hydrogen purification unit 125, e.g. a PSA-unit, from which a high purity $H_2$ stream 8 and an off-gas stream 9 are produced. The plant 100 is arranged to feed at least a part of the off-gas stream 9 from said hydrogen purification unit 125 as an off-gas recycle stream 9' to the feed side of the ATR 110, and/or as an off-gas recycle stream 9" to the feed side of the shift section, and/or as an off-gas recycle stream 9''' to the feed side of the prereformer unit 140, e.g. by mixing with natural gas feed 1 upstream a prereformer feed preheater (not shown). Preferably, the off-gas recycle stream 9', 9", 9''' to respectively the ATR (110), shift (HTS unit 115) and pre-reformer unit (140) is the compressed portion of the off-gas stream 9 which has been passed through an off-gas recycle compressor (not shown). The off-gas recycle stream 9 may also serve as fuel for a fired heater 135 and optionally also as fuel for steam superheaters, as described in connection with FIG. 1.

The invention claimed is:

1. A plant for producing a $H_2$-rich stream from a hydrocarbon feed, said plant comprising:
a reforming section comprising an autothermal reformer (ATR), said ATR being arranged to receive a hydrocarbon feed and convert it to a stream of syngas, and at least one fired heater, said at least one fired heater being arranged to pre-heat said hydrocarbon feed prior to the hydrocarbon feed being fed to the ATR;
a shift section, said shift section comprising a high temperature shift unit, said high temperature shift unit being arranged receive a stream of syngas from the ATR and shift it in a high temperature shift step, thereby providing a shifted syngas stream;
a $CO_2$ removal section, arranged to receive the shifted syngas stream from said shift section and separate a $CO_2$-rich stream from said shifted syngas stream, thereby providing a $CO_2$-depleted shifted syngas stream; and
a hydrogen purification unit, arranged to receive said $CO_2$-depleted shifted syngas stream, from said $CO_2$ removal section, and separate it into a high-purity $H_2$ stream and an off-gas stream,
wherein:

(a) said plant is arranged to feed at least a part of the off-gas stream from said hydrogen purification unit as an off-gas recycle stream to a feed side of the ATR;
(b) said plant is arranged to feed at least a part of the off-gas stream from said hydrogen purification unit as an off-gas recycle stream to a feed side of the shift section; and/or
(c) said plant further comprises at least one preformer unit arranged upstream the ATR, said preformer unit being arranged to pre-reform said hydrocarbon feed prior to it being fed to the ATR and wherein said plant is arranged to feed at least a part of the off-gas stream from said hydrogen purification unit as an off-gas recycle stream to a feed side of the prereformer unit, said plant further comprising:
(i) a compressor arranged for compressing said off-gas recycle stream, and a membrane separation unit for separating the thus compressed off-gas recycle stream into a permeate membrane stream and a retentate membrane stream, said compressor being arranged upstream of said membrane separation unit, said permeate membrane stream being hydrogen rich, and wherein
 a. said plant is arranged for recycling said permeate membrane stream, optionally via a compressor, to the feed side of the hydrogen purification unit, and/or
 b. said plant is arranged for mixing said permeate membrane stream with said high purity hydrogen stream from the hydrogen purification unit, and for recycling said membrane retentate as fuel for said at least one fired heater;
or
(ii) a compressor arranged for compressing said off-gas recycle stream, and a $CO_2$ separation unit for removal of $CO_2$ from the thus compressed off-gas recycle stream into a $CO_2$-rich off-gas stream and a $CO_2$-lean off-gas stream, said compressor being adapted upstream said $CO_2$ separation unit, and wherein said plant is arranged for recycling said $CO_2$-lean off-gas stream, optionally via a compressor, to: (a) the feed side of the ATR; (b) the feed side of the shift section; (c) the feed side of the hydrogen purification unit; and/or (d) said at least one fired heater as fuel.

2. The plant according to claim 1, wherein said off-gas recycle stream is mixed with hydrocarbon feed before being fed to the feed side of the ATR.

3. The plant according to claim 1, wherein said off-gas recycle stream is mixed with hydrocarbon feed before being fed to the feed side of the prereformer unit.

4. The plant according to claim 1, wherein the high temperature shift unit comprises a promoted zinc-aluminium oxide based high temperature shift catalyst.

5. The plant according to claim 1, wherein said plant is arranged to feed at least a part of the off-gas stream from said hydrogen purification unit as fuel for said fired heater.

6. The plant according to claim 1, wherein the hydrogen purification unit is selected from a pressure swing adsorption (PSA) unit, a hydrogen membrane or a cryogenic separation unit.

7. The plant according to claim 1, wherein the $CO_2$ removal section is selected from an amine wash unit, or a $CO_2$ membrane, or a cryogenic separation unit.

8. The plant according to claim 1, wherein the shift section comprises one or more additional high temperature shift units in series.

9. The plant according to claim 1, wherein said shift section further comprises one or more additional shift units downstream the high temperature shift unit.

10. The plant according to claim 9, wherein the one or more additional shift units are one or more medium temperature shift units and/or one or more low temperature shift units.

11. The plant according to claim 1, further comprising a methanol removal section arranged between the shift section and said $CO_2$ removal section, said methanol removal section being arranged to separate a methanol-rich stream from said shifted syngas stream.

12. The plant according to claim 1, the $CO_2$ removal section is a $CO_2$ membrane, said $CO_2$ membrane is arranged to produce a hydrogen-rich permeate stream for further enrichment in said hydrogen purification unit and a hydrogen-lean retentate stream,
wherein:
 said plant is arranged to feed at least a part of the hydrogen-lean retentate stream from said $CO_2$ membrane as a hydrogen recycle stream to the feed side of the ATR;
 said plant is arranged to feed at least a part of the hydrogen-lean retentate stream from said $CO_2$ membrane as a hydrogen recycle stream to the feed side of the shift section; and/or
 said plant is arranged to feed at least a part of the hydrogen-lean retentate stream from said $CO_2$ membrane as a hydrogen recycle stream to the inlet of the $CO_2$ membrane.

13. The plant according to claim 1, wherein the $CO_2$ removal section is a cryogenic separation unit, said cryogenic separation unit is arranged to produce a cryogenic unit off-gas stream and said $CO_2$-depleted shifted syngas stream, wherein;
 said plant is arranged to feed at least a part of the off-gas stream from said cryogenic separation unit as a cryogenic off-gas recycle stream to the feed side of the ATR;
 said plant is arranged to feed at least a part of the off-gas stream from said cryogenic separation unit as a cryogenic off-gas recycle stream to the feed side of the shift section; and/or
 said plant is arranged to feed at least a part of the off-gas stream from said cryogenic separation unit as a cryogenic off-gas recycle stream to the feed side.

14. The plant according to claim 1, said plant further comprising option (i).

15. The plant according to claim 1, said plant further comprising option (ii).

16. A process for producing a $H_2$-rich stream from a hydrocarbon feed, said process comprising the steps of:
 providing a plant according to claim 1;
 supplying a hydrocarbon feed to the ATR, and converting it to a stream of syngas;
 supplying a stream of syngas from the ATR to the shift section, and shifting it in a high temperature shift step, thereby providing a shifted syngas stream;
 supplying the shifted gas stream from the shift section to the $CO_2$ removal section, and separating a $CO_2$-rich stream from said shifted syngas stream, thereby providing a $CO_2$-depleted shifted syngas stream;
 supplying said $CO_2$-depleted shifted syngas stream from said $CO_2$ removal section to a hydrogen purification unit, and separating it into a high-purity $H_2$ stream and an off-gas stream; and,
 at least one step selected from:

feeding at least a part of the off-gas stream from said hydrogen purification unit as an off-gas recycle stream to the feed side of ATR;

feeding at least a part of the off-gas stream from said hydrogen purification unit as an off-gas recycle stream to the feed side of the shift section; and feeding at least a part of the off-gas stream from said hydrogen purification unit as an off-gas recycle stream to the feed side of the prereformer unit, the process further comprising compressing option (i) or compressing option (ii):

compressing option (i) comprising:

compressing said off-gas recycle stream;

separating the thus compressed off-gas recycle stream into the permeate membrane stream and the retentate membrane stream, said compressing step being conducted prior to said separating, said permeate membrane stream being hydrogen rich; and at least one step selected from:

recycling said permeate membrane stream, optionally via a compressing step, to the feed side of the hydrogen purification unit; and mixing said permeate membrane stream with said high purity hydrogen stream from the hydrogen purification unit, and recycling said membrane retentate as fuel for said at least one fired heater, compressing option (ii) comprising:

compressing said off-gas recycle stream;

removing $CO_2$ from the thus compressed off-gas recycle stream into a $CO_2$-rich off-gas stream and a $CO_2$-lean off-gas stream, said compressing step being conducted prior to said step of removing $CO_2$; and recycling said $CO_2$-lean off-gas stream, optionally via a compressing step, to at least one of:

the feed side of the ATR;

the feed side of the shift section;

the feed side of the hydrogen purification unit; and said at least one fired heater as fuel.

17. The process according to claim 16, wherein the steam/carbon ratio of the synthesis gas supplied from the ATR to the shift section is less than 2.0.

18. The process according to claim 16, wherein the temperature in the high temperature shift step is 300-600°.

19. The process according to claim 16, wherein the steam/carbon ratio of the synthesis gas from the reforming step, defined as the molar ratio of all steam added upstream the shift section to the carbon of the hydrocarbon feed, is 2.6-0.1.

20. The process according to claim 16, wherein the space velocity in ATR is less than 20000 $Nm^3$ $C/m^3/h$.

21. The process according to claim 16, wherein the synthesis gas is washed with water to reduce the methanol content.

22. The process according to claim 16, wherein the $CO_2$ depleted shifted gas stream comprises less than 500 or 400 ppmv $CO_2$.

23. The process according to claim 16, wherein the $CO_2$ removal section is a $CO_2$-membrane producing i) said $CO_2$-depleted shifted syngas stream as a hydrogen-rich permeate stream for further enrichment in said hydrogen purification unit and ii) a hydrogen-lean retentate stream;

the process further comprising:

feeding at least a part of the hydrogen-lean retentate stream as a hydrogen recycle stream to the feed side of the ATR; and/or feeding at least a part of the hydrogen-lean retentate stream as a hydrogen recycle stream to the feed side of the shift section.

24. The process according to claim 16, wherein the $CO_2$ removal section is a cryogenic separation unit producing a cryogenic unit off-gas stream and said $CO_2$-depleted shifted syngas stream, the process further comprising:

feeding at least a part of the off-gas stream from said cryogenic separation unit as a cryogenic off-gas recycle stream to the feed side of the ATR;

feeding at least a part of the off-gas stream from said cryogenic separation unit as a cryogenic off-gas recycle stream to the feed side of the shift section; and/or feeding at least a part of the off-gas stream from said cryogenic separation unit as a cryogenic off-gas recycle stream to the feed side.

25. The process according to claim 16, comprising compressing option (i).

26. The process according to claim 16, comprising compressing option (ii).

* * * * *